Feb. 14, 1967  E. JAULMES  3,303,720
FOLDING PEDAL FOR BICYCLES AND THE LIKE
Filed Nov. 17, 1964  2 Sheets-Sheet 1
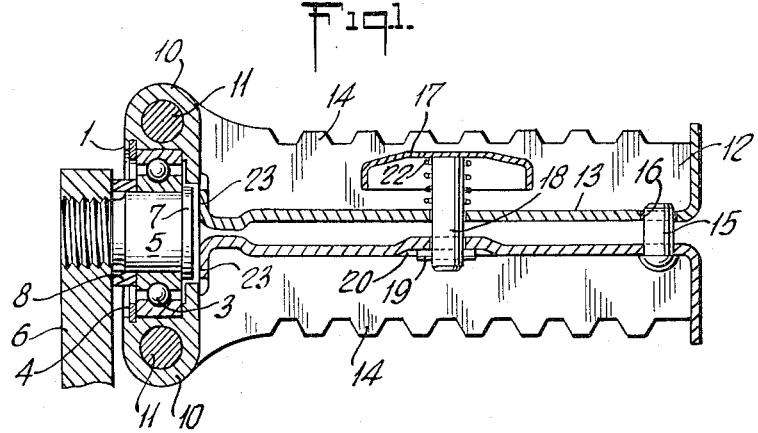
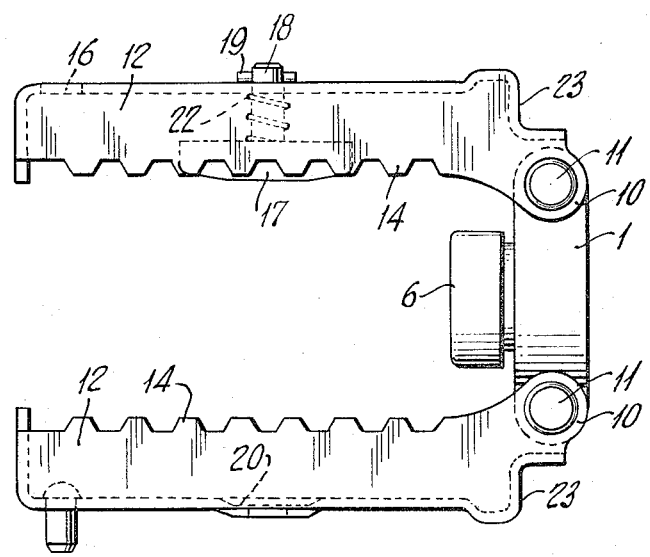
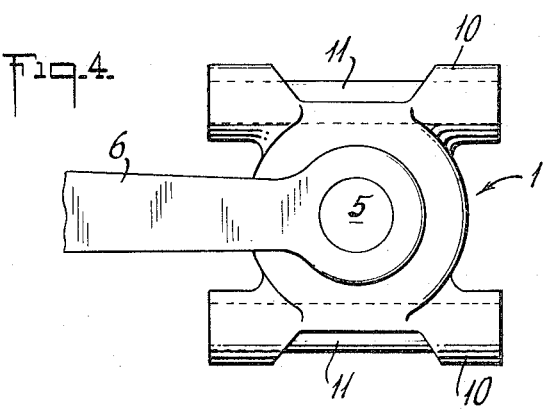
INVENTOR
ERIC JAULMES
BY  KARL RATH
ATTORNEY

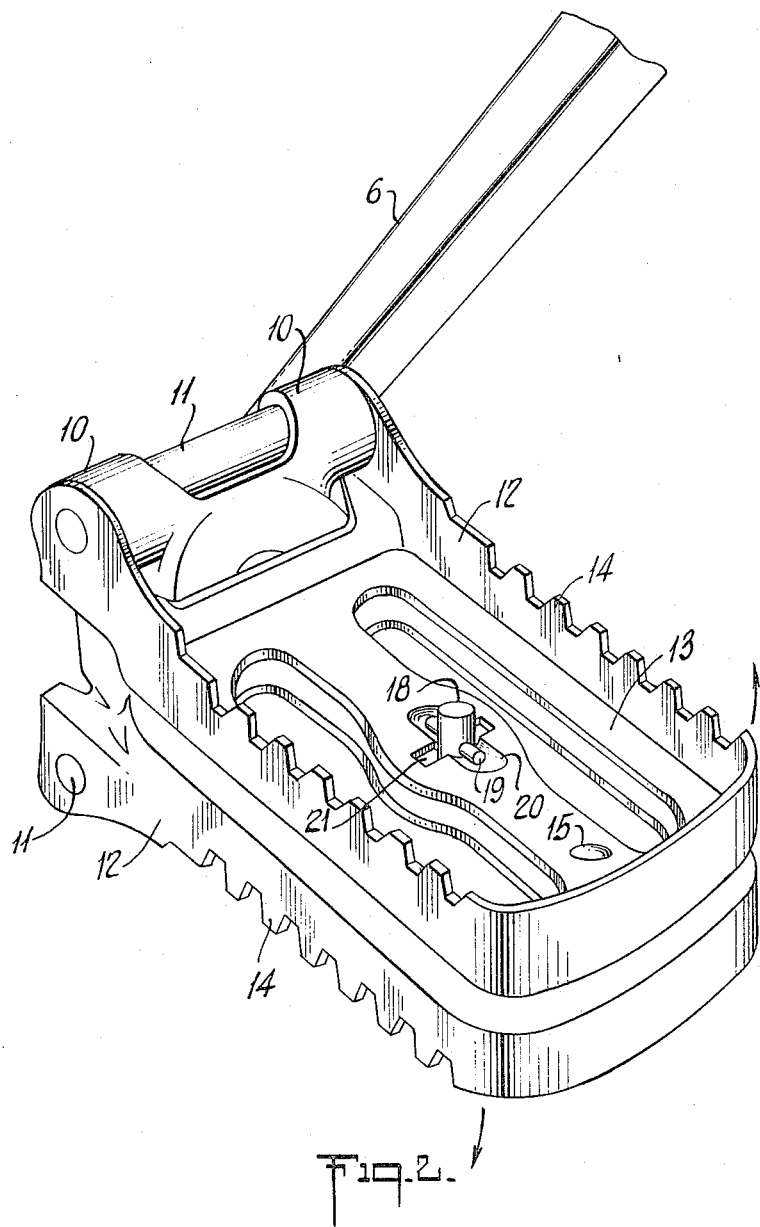

United States Patent Office 3,303,720
Patented Feb. 14, 1967

3,303,720
FOLDING PEDAL FOR BICYCLES AND THE LIKE
Eric Jaulmes, Paris, France, assignor to Ateliers de la Motobecane, a corporation of France
Filed Nov. 17, 1964, Ser. No. 411,896
Claims priority, application France, Nov. 20, 1963, 954,343
11 Claims. (Cl. 74—594.7)

The present invention relates to folding pedals for bicycles, motorcycles and the like devices, the main object of the invention being the reduction of the bulk or storage space of the devices, as well as the prevention of interference of the pedals with neighboring objects. The term "bicycle" as used in the following specification is, accordingly, intended to includes motorcycles and the like or equivalent devices designed for pedal operation or control.

It has already been proposed, in an effort to facilitate the shipping, storage or parking of bicycles, to equip the same with retractile or folding pedals capable of operation from the use or road position to an inoperative or non-use position, to reduce the bulk or lateral dimension, and in turn the storage space, thereof.

Various arrangements of retractile pedals have been suggested in the past all of which possess serious disadvantages and drawbacks. As an example, the pedals may be deflected about their rotating axis with the result of affording the provision of a single surface only for engagement by the cyclist's foot. Such a limitation in the use of the pedals is found highly inconvenient and undesirable from a practical standpoint. Other known arrangements require the locking or tightening of the pedals upon the folding or swivelling axis, both in the operative or use position, as well as in the inoperative or non-use position of the pedals, whereby to involve special and tiresome conversion operations in changing from one to the other position, and vice versa.

Still other known arrangements enable a partial retraction only of the pedals by leaving a portion thereof still to project outwardly or at right angle from the crank of the pedal.

Accordingly, an important object of the present invention is the provision of a folding bicycle pedal of the referred to type which is substantially devoid of the foregoing and related drawbacks and defects inherent in the known devices or constructions of this type according to the prior art.

A more specific object of the invention is the provision of a folding pedal construction of the referred to type which in the folded or retracted position, is substantially free from parts projecting outwardly from the crank of the pedals, or wherein the reduction of the bulk of the bicycle or the like device applies practically to the entire length of or normal extension of the pedals at right angle from the crank operated thereby.

Another object of the invention is the provision of a folding bicycle pedal of the referred to type which can be operated from its operative or use position to the retracted or inoperative position readily and instantly by the average person and without the use of any special tools or implements.

Yet another object of the invention is the provision of a retractile or folding bicycle pedal of the type referred to exhibiting great stability in the operative position, while exerting a minimum of stress or pressure on the supporting axle thereof during operation.

The invention, both as the foregoing and ancillary objects as well as novel aspects thereof, will be better understood from the following detailed description, taken in conjunction with the accompanying drawings forming part of this specification and in which:

FIG. 1 is an elevational cross-sectional view of a folding bicycle pedal, shown in the operative position and constructed in accordance with the principles of the invention;

FIG. 2 is a perspective view of the pedal, shown in the position with its lower half or member of FIG. 1 having been rotated by 180° to overlie the upper member in the preceding figure;

FIG. 3 is a side elevation of the pedal of FIG. 1 in the folded or inoperative position; and FIG. 4 is an end view of the pedal in the operative position as viewed in the direction of the arrows in FIG. 1.

Like reference numerals denote like parts in the different views of the drawings.

With the foregoing objects in view, the invention involves generally the provision of an improved bicycle pedal rotatively journalled upon the pin of an operating crank, to act as a supporting axle therefore, said pedal comprising essentially a support or frame rotatively mounted upon said pin and having a width in the axial direction substantially equal to the length of said pin. Preferably, the frame is supported by a ball or the like anti-friction bearing, as is customary in bicycle pedal and the like constructions. The pedal itself is comprised of a pair of identical, preferably rectangular and dish-shaped, pedal halves or members rotatively supported by said frame about a pair of axes disposed at right angle to and at equal spacing distances from or symmetrically with respect to the rotating axis of said frame. As a consequence, both half pedals or pedal members may be swung or rotated from a normally closely spaced parallel and operative position of extension at right angle and away from said crank to a retracted or inoperative position of extension towards and beyond said crank, by rotation of said members in opposite directions and through angles of substantially 180°, and vice versa, respectively. In orther words, the pedal may be retracted to practically its entire normal projecting length towards the interior of the bicycle or the like device, whereby to reduce the bulk to a minimum and to leave a surface free from projecting parts liable to be caught by or to interfere with neighboring or surrounding objects or devices, in a manner as will become further apparent as the following description proceeds.

The two pedal halves or members are advantageously locked or secured to one another in the operative position by the provision of suitable aligning and releasable locking means, to improve the stability of the pedal in the operative position. Besides, the pedal members may be designed to rest against the frame forming an abutment in the operative position of the pedals, in an effort to reduce the effect of the operating pressure on the supporting axle, as described and further understood from the description of the drawings.

Referring more particularly to the latter, the folding pedal shown comprises a support of frame 1 forming, in the example illustrated, the casing for a ball bearing 3 which has its outer race fixed in said casing by a snap ring 4, or by means of any other suitable securing means. The axle 5, the length of which is practically limited to the width of the frame 1 in the axial direction, is screwed into the end of the crank 6 of the pedal, to act as a crankpin, and has its end formed with a radial flange 7 for the securing of the inner ring or race of the ball bearing to the pin or axle 5 in cooperation with a spacing ring or washer 8, in the manner shown and understood from the drawing.

The frame 1 is fitted with two pairs of eyelet-shaped extensions or bearings 10 being perpendicular to the axis of the pin 5 and serving to rotatively support a pair of spindles 11 forming part of a pair of identical half pedals or members 12. The spindles 11 acting as pivot axis are advantageously connected each to a pair of supporting lugs extending from the short ends of the rectangular and dish shaped pedal members 12, in the example illustrated. As a consequence, the members 12 may be swung from their operative or road position, or position of extension from said frame at right angle to and outwardly from the crank 6, FIGS. 1 and 2, to an inoperative or non-use position, or position of extension inwardly or towards and beyond said crank, by rotation in opposite directions through angles of substantially 180°, as seen from FIG. 3 showing the retracted position of the pedal members.

In the preferred construction of the pedal, each of the members 12 takes the form of an oblong rectangular dish having a bottom wall 13 and having its longer side wall provided with anti-skid teeth or serrations 14, in a manner well known in the construction of bicycle or the like pedals of this type.

In order to provide adequate stability, or to assist in the alignment of the members 12 in the operative position, the lower member, FIG. 1, is fitted with a central bolt or pin 15 engaging, in the operative position of the pedal a bore or perforation 16 in the bottom of the upper member. The latter is furthermore fitted with a locking knob or the like member 17 having a depending stem 18 which passes through aligned holes or apertures in the bottom walls 13 of the members, said stem being in turn fitted with a crosspin 19 at its outer end adapted to pass through a diametrical slot or aperture 21 adjoining the opening in the lower member, FIG. 1, or upper member, FIG. 2, respectively. Further provided at right angle to the slot 21 is a recess or depression 20 in the bottom wall 13 of one of the members 12, that is, the lower member, FIG. 1, and the upper member, FIG. 2, whereby rotation of the knob 17 enables the crosspin 19 to be oriented to be positioned either in the depression 20 or in a direction transverse thereto, to thereby allow the pin 19 to pass through the slot or aperture 21 for the unlocking of the members. A compression spring 22 acts to resiliently urge the pin 19 against the depression 20 in the locked or operative position of the members, FIGS. 1 and 2, while allowing of unlocking of the members by both axial and rotative movement of said knob against the action of the spring 22 and withdrawing of the pin through the slot 20. As a consequence, the bottom walls 13 of the members 12 in the operative or locked position are closely spaced and opposed to one another, whereby at the same time one of the end walls of the members bears against the lateral face of the frame 1 acting as an abutment, as shown at 23 in FIG. 1, to thereby relieve the axle 5 from pressure originating from the foot or operating pressure applied to one of the pedal members during use.

There is thus provided by the invention a folding pedal construction being constituted by two pedal halves or members arranged symmetrically in respect to the rotating axis of the pedal, whereby each of said members may be used separately and independently of the other member. Only in the case of severe use of the pedal, when the upper pedal member may assume a downwardly and outwardly inclined position as a result of the foot operating pressure applied to the pedal during use, will the bolt 15 be subjected to a shearing action such as to transfer the pressure to the other member and to thereby reduce the play, or the undesirable slanting angle of the pedal to within practically admissible limits.

As pointed out, in the normal or use position of the pedal, FIGS. 1 and 2, the lock 17, 18 is rotated to a position of the crosspin 19 engaging the recess 20, whereby the two pedal members 12 are resiliently secured to one another and the pedal may be used in the manner of an ordinary pedal with either of the members in the upper or operative position.

If it is desired to retract the pedal to its folded or inoperative position, FIG. 2, this may be achieved simply and instantly by first applying axial pressure upon the knob 17 against the action of the spring 22, to thereby disengage the pin 19 from the recess 20, whereupon the knob is rotated through an angle of 90°, to displace said pin so as to be in line with the slot or aperture 21. In this position of the pin 19, the knob 17 may be withdrawn and both members 12 disengaged and swung rearwardly in opposite directions into their inoperative or retracted positions, as shown in FIG. 3. In the latter position, the members are retained by friction, while the frame 1 presents a perfectly smooth outer surface free from the danger of interfering with neighboring objects. The described operations if carried out in the reverse sequence will result in the restoration of the operative or road position of the pedal, as will be readily understood.

From the foregoing, it can readily be seen that in the operative or road position of pedal, FIGS. 1 and 2, the lock 17, 18, in contrast to certain known prior arrangements, is completely relieved from any stresses or pressure originating from the pedal operation, inasmuch as the foot pressure applied to any of the members 12 is transmitted to the frame 1 and from there to the crank 6 by way of the abutment surfaces 23 of each of the half pedals or members. The latter may accordingly be operated substantially independently of one another, whereby any wear that may occur will be divided equally upon both axes or spindles 11. The latter advantageously have a length equal to the dimension of the pedal transverse to the rotating axis of the frame 1, whereby to result in increased mechanical stability, especially against impulse forces or shock to which the pedal may be subjected in use. Due to the joining of the members 12 by the bolt 15, the two spindles 11 jointly absorb such forces imposed upon the pedal from the outside, especially to so-called "curb blows" to which the pedals are subjected during the parking of bicycles on the sidewalks.

As will be understood, in place of the serrated construction of the pedal members 12, the latter may be fitted with rubber pads or the like and optical reflectors acting as signal lights during the night. Furthermore, the locking device 17, 18 may be replaced by any known equivalent mechanisms or devices which will readily suggest themselves to those skilled in the art.

In the foregoing the invention has been described in reference to a specific illustrative device. It will be evident, however, that variations and modifications, as well as the substitution of equivalent parts or elements, for those shown for illustration, may be made without departing from the broader purview and spirit of the invention as embraced by the appended claims. The specification and drawings are accordingly to be regarded in an illustrative rather than in a restrictive sense.

I claim:

1. A folding pedal for bicycles and the like including a crank having a crank pin at the end thereof, to provide a supporting axle for said pedal, said pedal comprising in combination:
    (1) a frame rotatively supported by said pin and having a width in the axial direction substantially equal to the length of said pin,
    (2) a pair of identical pedal members,
    (3) means rotatively supporting said members by said frame about a pair of axes disposed at right angle to and at equal spacing distances from the axis of rotation of said frame, whereby to enable said members to be swung in opposite directions from a closely spaced and parallel operative position of extension away from said crank to a retracted position of extension towards and beyond said crank, and vice versa, and
    (4) releasable locking means operably connected with said members, to fix said members in the operative position.

2. A folding pedal as claimed in claim 1, including further means to align said members in the operative position.

3. A folding pedal as claimed in claim 2, said last means being comprised of a bolt projecting from one of said members and engaging a bore in the other member in the operative position of the members.

4. A folding pedal as claimed in claim 1, each of said members having an end surface engaging said frame in the operative position, whereby to relieve said pin from foot operating pressure applied to said members.

5. A folding pedal as claimed in claim 1, said first-mentioned means being comprised of a pair of spindles each rigid with one of said members and rotatively supported by said frame, the length of said spindles being substantially equal to the dimension of said members transverse to the rotating axis of said frame.

6. A folding pedal for bicycles and the like including a crank having a crank pin at the end thereof, to provide a supporting axle for said pedal, said pedal comprising in combination:
  (1) a frame rotatively supported by said pin and having a width in the axial direction substantially equal to the length of said pin,
  (2) a pair of identical oblong rectangular and dish-shaped pedal members having side, end and bottom walls,
  (3) means rotatively supporting one of the ends of each of said members by said frame about a pair of axes disposed at right angle to and at equal spacing distances from the axis of rotation of said frame, whereby to enable said members to be swung from an operative position with their bottom walls opposed to and closely spaced from one another and extending in a direction away from said crank to a retracted position of extension of said members towards and beyond said crank, and vice versa, and
  (4) releasable locking means to fix the bottom walls of said members in the operative position.

7. A folding pedal as claimed in claim 6, including an aligning bolt projecting from the bottom wall of one of said members and engaging a bore in the bottom wall of the other member in the operative position of said members.

8. A folding pedal as claimed in claim 6, the supporting end walls of said members having an abutment surface engaging said frame in the operative position of said members, whereby to relieve said pin from foot operating pressure applied to said members.

9. A folding pedal as claimed in claim 6, said first means being comprised of a pair of spindles each affixed to a pair of extension lugs of an end wall of said members, said spindles having a length substantially equal to the dimension of said members transverse to the rotating axis of said frame and being rotatively supported by a pair of eyelet-like extensions of said frame.

10. A folding pedal as claimed in claim 6, said locking means consisting of a spring-loaded stem having an operating knob at one end and a cross-pin at its opposite end, said stem passing through aligned openings in the bottom walls of said members, one of said openings formed with a dimetrical slot adapted to pass said pin, whereby to enable locking and unlocking of said members by axial and rotative movement of said knob.

11. A folding pedal as claimed in claim 6, wherein the side walls of said members are formed with serrated anti-skid edges.

References Cited by the Examiner
UNITED STATES PATENTS

| | | | |
|---|---|---|---|
| 706,028 | 8/1902 | Cullen | 74—594.7 |
| 1,276,139 | 8/1918 | Warren | 74—594.7 |
| 2,323,913 | 7/1943 | Johnson | 74—594.7 |

FRED C. MATTERN, JR., *Primary Examiner.*

W. S. RATLIFF, JR., *Assistant Examiner.*